United States Patent
Kajmowicz et al.

(10) Patent No.: US 9,043,288 B2
(45) Date of Patent: May 26, 2015

(54) DUAL-PHASE FILE SYSTEM CHECKER

(75) Inventors: Garrett Arthur Kajmowicz, Bellevue, PA (US); Richard Jernigan, Sewickley, PA (US)

(73) Assignee: NetApp, Inc., Sunnyvale, CA (US)

(*) Notice: Subject to any disclaimer, the term of this patent is extended or adjusted under 35 U.S.C. 154(b) by 1493 days.

(21) Appl. No.: 12/259,156

(22) Filed: Oct. 27, 2008

(65) Prior Publication Data

US 2014/0081923 A1 Mar. 20, 2014

(51) Int. Cl.
| | |
|---|---|
| G06F 17/00 | (2006.01) |
| G06F 17/30 | (2006.01) |
| G06F 11/14 | (2006.01) |

(52) U.S. Cl.
CPC ...... *G06F 17/30144* (2013.01); *G06F 11/1435* (2013.01)

(58) Field of Classification Search
CPC .......... G06F 17/30144; G06F 11/1435; G06F 17/3007
USPC ...................................... 707/999.2, 634, 687
See application file for complete search history.

(56) References Cited

U.S. PATENT DOCUMENTS

| | | | | |
|---|---|---|---|---|
| 5,485,579 | A * | 1/1996 | Hitz et al. ...................... | 709/221 |
| 5,727,206 | A * | 3/1998 | Fish et al. .............................. | 1/1 |
| 5,828,876 | A * | 10/1998 | Fish et al. .............................. | 1/1 |
| 5,875,444 | A * | 2/1999 | Hughes ................................. | 1/1 |
| 5,956,734 | A * | 9/1999 | Schmuck et al. ..................... | 1/1 |
| 6,029,168 | A * | 2/2000 | Frey ...................................... | 1/1 |
| 6,601,070 | B2 * | 7/2003 | Zhang et al. .......................... | 1/1 |
| 7,069,594 | B1 * | 6/2006 | Bolin ............................... | 726/26 |
| 7,366,834 | B2 * | 4/2008 | McGovern et al. ........... | 711/112 |
| 7,590,807 | B2 * | 9/2009 | McGovern et al. ........... | 711/159 |
| 7,613,947 | B1 * | 11/2009 | Coatney et al. .................... | 714/6 |
| 7,698,289 | B2 * | 4/2010 | Kazar et al. ................... | 707/802 |
| 2002/0147719 | A1 * | 10/2002 | Zhang et al. ...................... | 707/9 |
| 2005/0097260 | A1 * | 5/2005 | McGovern et al. ........... | 711/100 |
| 2005/0192932 | A1 * | 9/2005 | Kazar et al. ........................ | 707/1 |
| 2005/0273858 | A1 * | 12/2005 | Zadok et al. ..................... | 726/24 |
| 2007/0118687 | A1 * | 5/2007 | McGovern et al. ........... | 711/112 |
| 2008/0189343 | A1 * | 8/2008 | Hyer et al. ..................... | 707/205 |

OTHER PUBLICATIONS

Wright, Charles P., et al., "Versatility and Unix Semantics in a Fan-Out Unification File System", Stony Brook University Technical Report FSL-04-01b, Citeseer, © 2004, pp. 1-14.*

(Continued)

*Primary Examiner* — Robert Stevens
(74) *Attorney, Agent, or Firm* — Mahamedi Paradice LLP

(57) ABSTRACT

Methods and a processing system directed to a file system checker are described. A file system checker performs file system validation by validating a file system's nodes. Each node is associated with two kinds of data: metadata and referenced data. A file system checker may validate one node at a time or a group of nodes contemporaneously (e.g., in parallel). The file system checker uses a dual phase procedure. The first phase includes validating metadata. The second phase includes validating, as appropriate, node type or link count. Dual phase file system checking allows validation of a node without validating referenced data associated with downstream nodes. Where validation of a given node requires validating a downstream node, performing a first phase test on the downstream node is sufficient to validate the given node. Upon completion, the given node may be unlocked for access by external devices and users.

26 Claims, 14 Drawing Sheets

Dual Phase Method Overview

(56) References Cited

OTHER PUBLICATIONS

Schmuck, Frank, et al., "GPFS: A Shared-Disk File System for Large Computing Clusters", FAST '02, Monterey, CA, Jan. 28-30, 2002, pp. 231-244.*

Fu, Kevin E., "Group Sharing and Random Access in Cryptographic Storage File Systems", Massachusetts Institute of Technology, Cambridge, MA, Master of Engineering in Electrical Engineering and Computer Science, Jun. 1999, pp. 1, 3-11, 13-45, 47-63, 65-69, 71-75, 77, 79-83 and 85.*

* cited by examiner

Data Repository Example

File System Internal Structure

Single Phase File System Checking

Single Phase Scan: Deadlock Situation

Dual Phase File System Checking

Dual Phase Method Overview

First Phase: Test A (Metadata)

First Pass: Test A: Heuristic Analysis

Second Phase: Test C (Directories)

File System Internal Structure

Parallel Testing of Nodes

Example Data Repository Implementation

Example Processing System Implementation

DUAL-PHASE FILE SYSTEM CHECKER

TECHNICAL FIELD

Some example embodiments relate generally to data storage, and more specifically, to a dual-phase file system checker.

BACKGROUND

In the 21st century, information often takes the form of data. Modern data processing systems (e.g., computers) store data using "data repositories." Examples of data repositories include disk drives and flash memory drives. A single data repository may include only one physical storage unit (e.g., a disk drive, or a flash memory drive) or may include multiple physical storage units (e.g., several disk drives).

Within a data repository, data is organized into a logical structure called a "file system." A "file" is a logically cohesive body of data. Examples of files include documents, images, music, movies, software programs, and databases. A file system enables external devices and users to access files in a data repository.

File systems are vulnerable to data corruption. A file system validation tool (e.g., a file system checker) is useful for avoiding data corruption by testing a file system's individual constituents, and repairing the individual constituents if necessary, to ensure that the file system is self-consistent.

An example of a technical challenge that may exist is performing file system validation quickly. A related example that may exist is performing file system validation with minimum disruption for external devices and users of the filesystem (e.g., minimal delay during validation).

SUMMARY

A dual-phase file system checker validates a node without a need to validate referenced data associated with downstream nodes. A brief overview of file system concepts is helpful in understanding a dual-phase file system checker.

As presented to external devices and users, a file system appears as a hierarchical tree structure composed of files and "directories." A "directory" (also known as a "folder") may contain files and/or other directories (called "subdirectories" or "subfolders"). Similarly, a subdirectory may contain files or further subdirectories.

Internally, however, the data of files and directories are organized in a file system by data structures called "nodes." In this specification, a "node" is a data structure used to organize data in a file system. In many file systems, a node may be an "index node," which is also known as an "inode." Some file systems, however, use similar data structures but do not use the terms "node" or "inode." As used herein, the term "node" includes all data structures used to organize data in a file system. Within a file system, a node may represent, for example, a file, a directory, or an "access control list." As used herein, an "access control list (ACL)" is a list of users and their respective permissions to access a file or directory.

Each node is associated with two kinds of data: "metadata" and "referenced data." As used herein, a node's "metadata" is information about that node and its referenced data. Examples of metadata include "node type," "link count," "date," and "time." Node type refers to the function of the node within the file system (e.g., a file, a directory, or an ACL). In the example of a directory node, one example of metadata is a "link count" (e.g., the number of subdirectories and/or junctions linked to that directory inode).

Another kind of data, a node's "referenced data" is information content associated with the node. For example, in the example of a file node, the referenced data is the contents of the file (e.g., words of a document, or entries in a database). In the example of an ACL node, the referenced data is the contents of the access control list (e.g., users and their respective permissions). A node's referenced data may include references to other nodes. For example, in the example of a directory node, the referenced data is the contents of the directory (e.g., files and subdirectories). Where a node's referenced data includes references to other nodes, the other nodes are called "downstream nodes" in this specification.

A "file system checker" is a file system validation tool. File system validation is performed by validating a file system's nodes. As used herein, "validation" means testing a node for consistency with other nodes in the file system.

External devices and users are prevented from accessing a node during its validation. As used herein, "locking access" refers to preventing external devices and users from accessing a node. Conversely, as used herein, "unlocking access" refers to allowing external devices and users to access a node.

A file system checker may validate one node at a time or a group of nodes contemporaneously (e.g., in parallel). The instant file system checker uses a dual phase procedure to validate a node (or a group of nodes). The first phase includes validating metadata of the node. The second phase includes validating metadata of one or more downstream nodes, as appropriate, for example, node type (e.g., for a downstream ACL node) or link count (e.g., for a downstream directory node).

Dual phase file system checking allows validation of a node without validating referenced data associated with downstream nodes. Where validation of a given node requires validating a downstream node, performing a first phase test on the downstream node is sufficient to validate the given node. Upon completion of the first phase test, the given node may be unlocked for access by external devices and users without waiting for full validation of all downstream nodes.

One result that may occur is completion of file system validation quickly and/or with minimum disruption for external devices and users of the file system. Additionally, operating a file system checker to validate multiple nodes in parallel also contributes to this result.

BRIEF DESCRIPTION OF THE DRAWINGS

Some embodiments are illustrated by way of example and not limitation in the figures of the accompanying drawings in which.

DETAILED DESCRIPTION

Example systems and methods directed to a "file system checker" are described. Examples merely typify possible variations. Individual components and functions are optional unless explicitly required, and the sequence of operations may vary. In the following description, for purposes of explanation, numerous specific details are set forth to provide a thorough understanding of example embodiments. It will be evident, however, to one skilled in the art that the present invention may be practiced without these specific details.

A dual-phase file system checker is a file system validation tool. File system validation is performed by validating a file system's nodes. As used herein, "validating" a node refers to testing a node for consistency with other nodes in the file system. It should be noted that external devices and users are prevented from accessing a node during its validation. As used herein, "locking access" refers to preventing external devices and users from accessing a node (e.g., during validation). Conversely, "unlocking access" refers to allowing external devices and users to access a node (e.g., after validation has been completed).

A dual-phase file system checker may validate one node at a time (e.g., singly) or a group of nodes contemporaneously (e.g., in parallel). The dual-phase file system checker uses a two phase procedure to validate a node (or a group of nodes). The first phase includes validating metadata. The second phase includes validating, as appropriate, node type (e.g., for an ACL node) or link count (e.g., for a directory node).

Dual phase file system checking allows validation of a node without validating referenced data associated with downstream nodes. Where validation of a given node requires validating a downstream node, performing a first phase test on the downstream node is sufficient to validate the given node. Upon completion of the first phase test, the given node may be unlocked for access by external devices and users without waiting for full validation of all downstream nodes.

Figure 1:
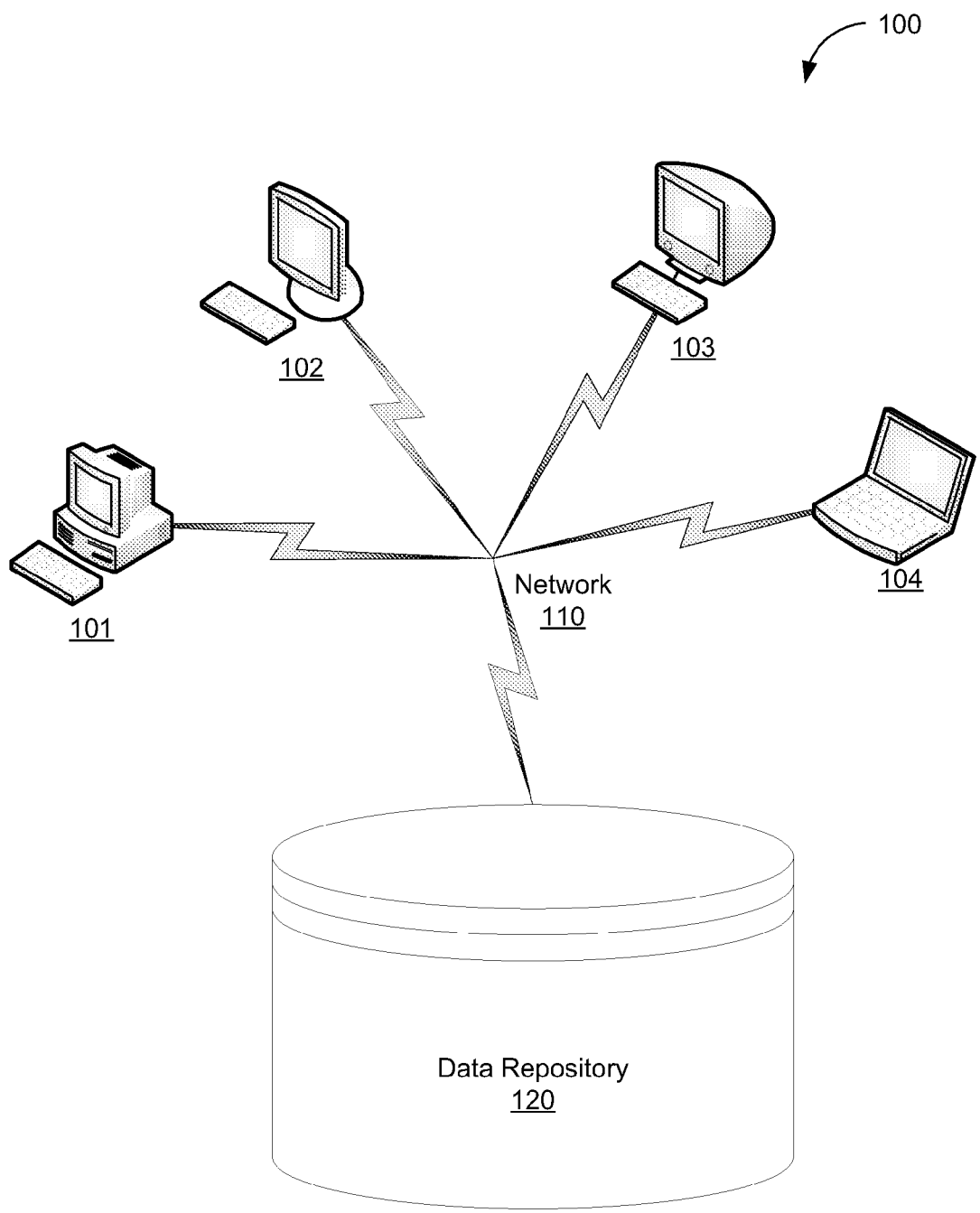
FIG. 1 illustrates an example of a data repository.

FIG. 1 illustrates an example of a "data repository." As used herein, "data repository" means a system or device for storing data. Examples of data repositories include disk drives and flash memory drives.

In the example shown, a data processing environment 100 includes multiple data processing systems 101-104 connected (e.g., attached) by a network 110 to a data repository 120. In some example embodiments, the multiple data processing systems 101-104 are computer systems. In certain example embodiments, the network 110 is a wireless network. Alternatively, in other example embodiments, the network 110 is a wired network.

The data repository 120 may include only one physical storage unit (e.g., a disk drive, or a flash memory drive). Alternatively, the data repository 120 may include multiple physical storage units (e.g., several disk drives). According to some example embodiments, the data repository 120 behaves like a single physical storage unit from the viewpoint of external devices and users.

Figure 2:
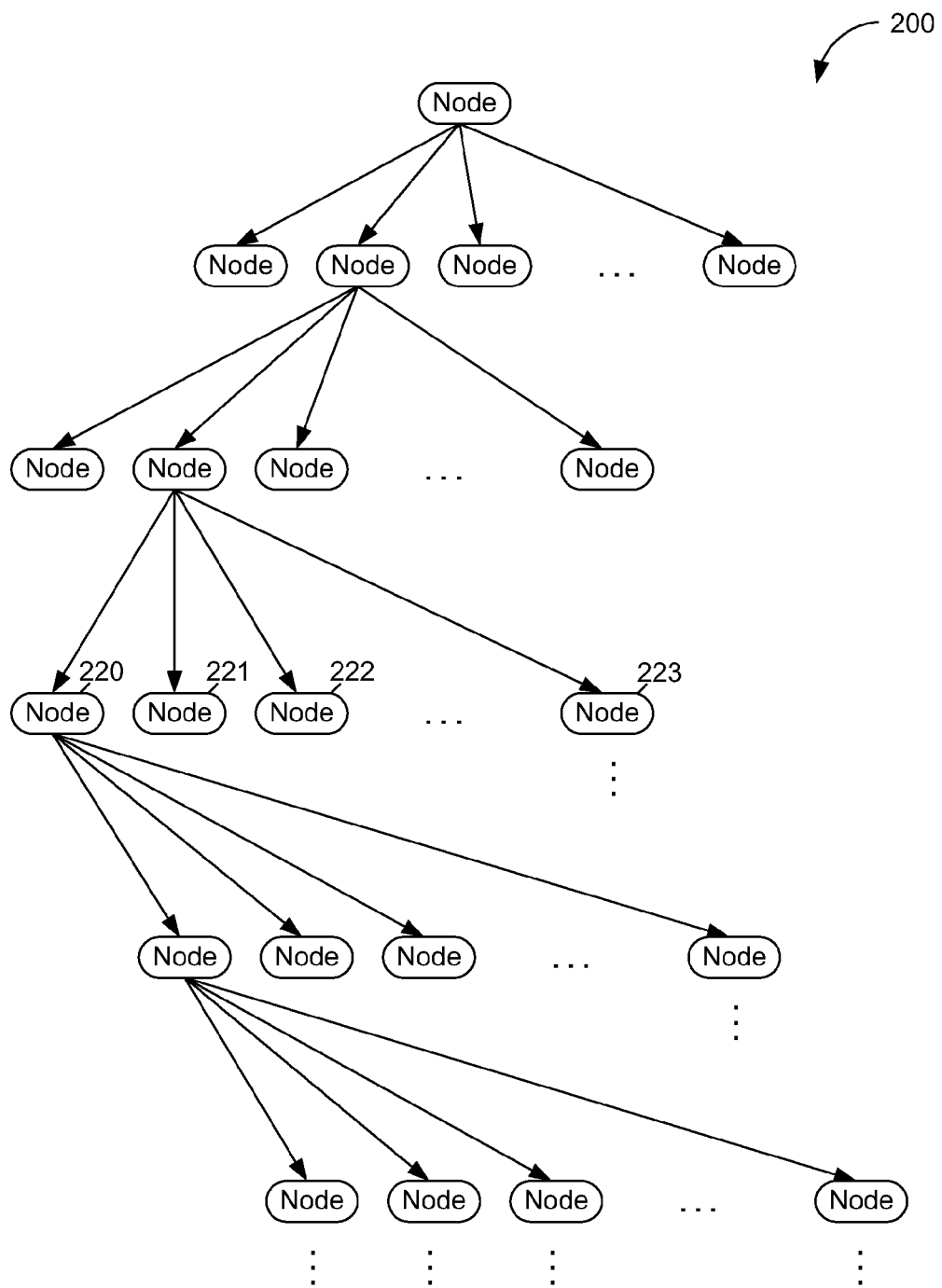
FIG. 2 illustrates an example of an internal structure of a file system, depicted as a hierarchical tree structure.

FIG. 2 illustrates an example of an internal structure of a file system 200, depicted as a hierarchical tree structure. As used herein, a "file system" is a logical structure for organizing data in a data repository. A file system enables external devices and users to access files in the data repository.

In some example embodiments, a file system (e.g., file system 200) may be a "striped file system." As used herein, a "striped file system" refers to a file system implemented to organize data in a single data repository that includes multiple logical storage units. A logical storage unit is called a "volume" and may further include one or more physical storage units (e.g. one or more disk drives). As used herein, "striping" volumes refers to implementing a file system on multiple volumes in parallel, for example, by allocating storage areas of a volume to multiple controllers (e.g., disk controllers). "Striped volumes" may be used to obtain increased performance in storing and retrieving data (e.g., increased read/write speed) and/or obtain improved scalability (e.g., improved ability to increase or decrease storage capacity), in comparison to a non-striped volume, due to parallel use of multiple controllers. Striped volumes may be attached to multiple processing systems (e.g., computers).

Striping of a volume may occur more than once, depending on need (e.g., to alter the storage capacity of the volume). For example, a data repository with two volumes may be striped to implement a file system (e.g., file system 200). Later, the two volumes may be re-striped to accommodate, for example, expansion of the data repository by addition of a third volume.

As presented to external devices and users, the file system 200 appears as a hierarchical tree structure composed of "files" and "directories." As used herein, a "file" is a body of data. Examples of files include documents, images, music, movies, software programs, and databases. In this specification, a "directory" (also known as a "folder") is a constituent of the file system that functions as a container for files and/or other directories (called "subdirectories" or "subfolders"). Similarly, a "subdirectory" may contain files or further subdirectories.

Internally, however, the data of files and directories are organized in a file system (e.g., file system 200) by data structures called "nodes" (e.g., nodes 220-223). In this specification, a "node" (e.g., node 220) is a data structure used to organize data in a file system. In many file systems (e.g. file system 200), a node (e.g., node 220) may be an "index node," which is also known as an "inode." Inodes serve the same function as nodes. Some file systems, however, use similar data structures but do not use the terms "node" or "inode." As used herein, the term "node" includes all data structures used to organize data in a file system. Within a file system, a node (e.g., node 220) may represent, for example, a file, a directory, or an "access control list." As used herein, an "access control list (ACL)" is a list of users and their respective permissions to access a file or directory.

In the example shown, the file system 200 includes several nodes (e.g., nodes 220-223). Each node (e.g., node 220) is associated with two kinds of data: "metadata" and "referenced data." As used herein, a node's "metadata" is information about that node and its referenced data. Examples of metadata include "node type," "data length," "epoch," "link count," "date," and "time." Node type refers to the function of the node within the file system (e.g., a file, a directory, or an ACL). A "data length" refers to the amount of data referenced by the node (e.g., node 220). In some embodiments, data length is measured using a number of bits or bytes. An "epoch" refers to the number of times a striped volume has been striped or re-striped. In the example of a directory node, one example of metadata is a "link count" (e.g., the number of subdirectories and/or junctions linked to that directory inode).

Another kind of data, a node's "referenced data" is information content associated with the node. For example, in the example of a file node, the referenced data is the contents of the file (e.g., words of a document, or entries in a database). In the example of an ACL node, the referenced data is the contents of the access control list (e.g., users and their respective permissions). A node's referenced data may include references to other nodes (see, e.g., node 220). For example, in the example of a directory node, the referenced data is the contents of the directory (e.g., files and subdirectories). Where a node's referenced data includes references to other nodes, the other nodes are called "downstream nodes" in this specification.

Figure 3:
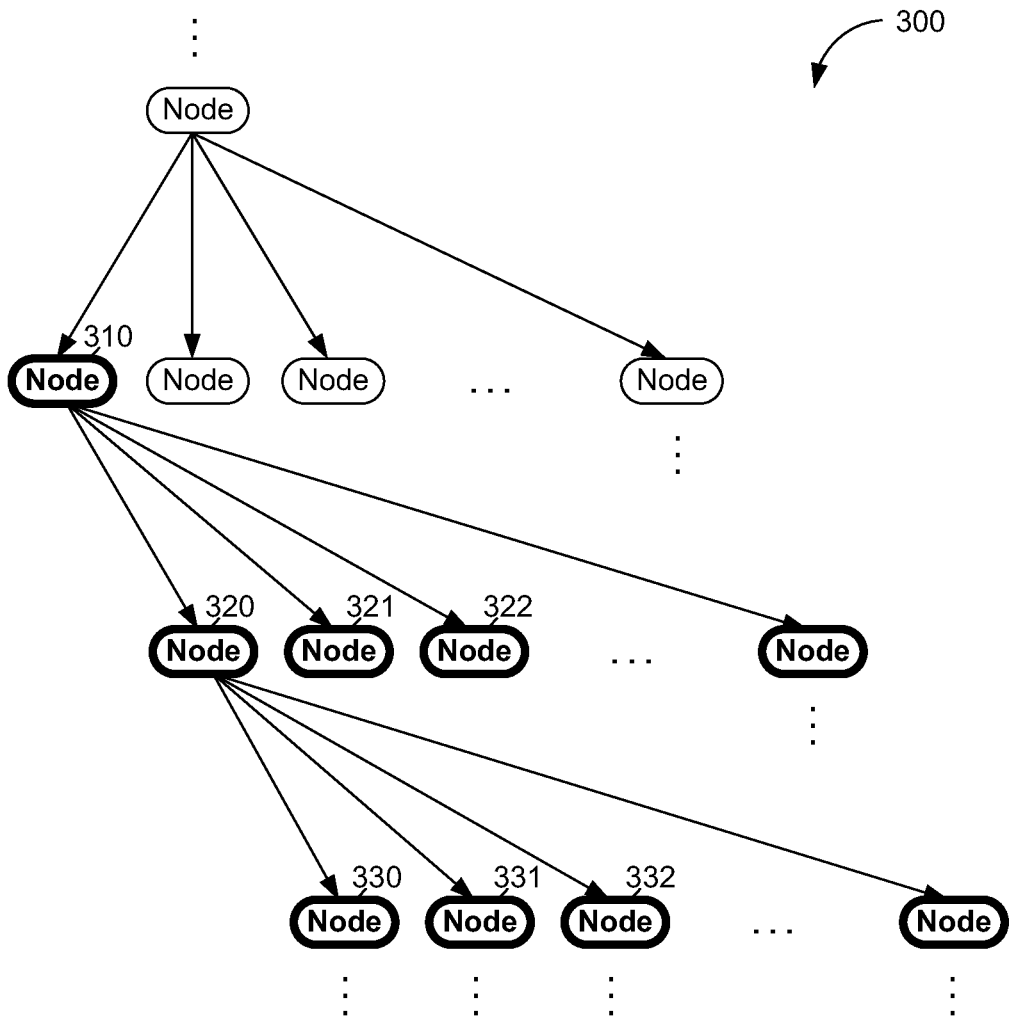
FIG. 3 illustrates an example of an internal structure of a file system during single phase file system checking.

FIG. 3 illustrates an example of an internal structure of a file system during single phase file system checking. Single phase file system checking involves locking access to a node from external devices and users, validating both the node's metadata and its referenced data, and unlocking access to the node by external devices and users. This methodology is applied consistently for each node to be validated.

In the example shown, a portion 300 of a file system contains a given node 310 to be validated. Validating the given node 310 involves validating its metadata and its referenced data. Because the given node 310 refers to other nodes (e.g., nodes 320-322), validating the referenced data of the given node 310 cannot complete without validation of both metadata and referenced data for the other nodes (e.g., nodes 320-322).

Furthermore, one of the other nodes (e.g., node 320) may refer to still other downstream nodes (e.g., nodes 330-332). Consequently, in single phase file system checking, validation of the given node 310 cannot complete until all of its downstream nodes (e.g., nodes 320-322 and nodes 330-332) have been fully validated.

Figure 4:
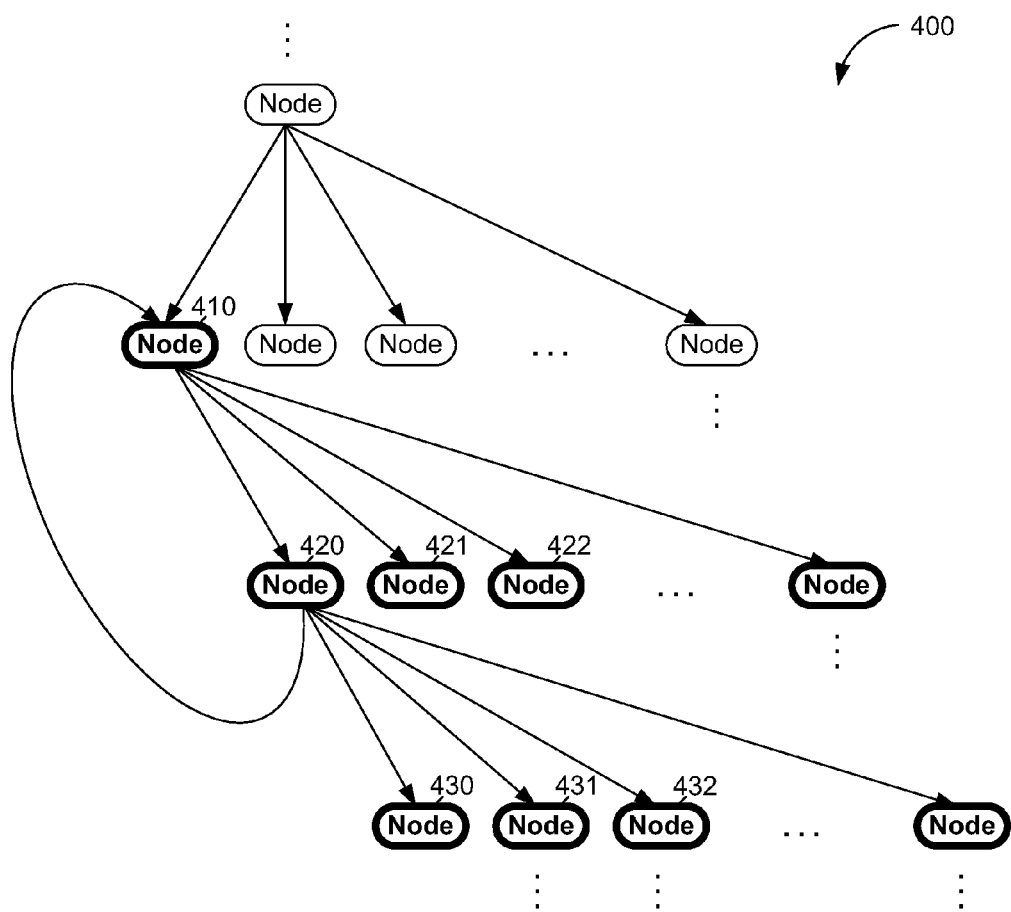
FIG. 4 illustrates an example of an internal structure of a file system during single phase file system checking and encountering a deadlock situation.

FIG. 4 illustrates an example of an internal structure of a file system during single phase file system checking and encountering a deadlock situation. A deadlock situation may result where node references form a closed loop (e.g. symmetric or circular references between or among nodes).

In the example shown, a portion 400 of a file system contains a given node 410 to be validated. Validating the given node 410 involves validating its metadata and its referenced data. Because the given node 410 refers to other nodes (e.g., nodes 420-422), validating the referenced data of the given node 410 cannot complete without validation of both metadata and referenced data for the other nodes (e.g., nodes 420-422). Up to this point, this situation is similar to the situation shown in FIG. 3.

As shown in the example, however, one of the other nodes (e.g., node 420) refers to the given node 410. Using single phase file system checking, validation of the given node 410 cannot complete until all of its downstream nodes (e.g., nodes 420-422 and nodes 430-432) have been fully validated. The situation is deadlocked because validation of one of the downstream node (e.g., node 420) cannot complete until the given node 410 has been fully validated. This situation results from the given node 410 being its own downstream node. Consequently, validation of the given node 410 will never complete.

Figure 5:
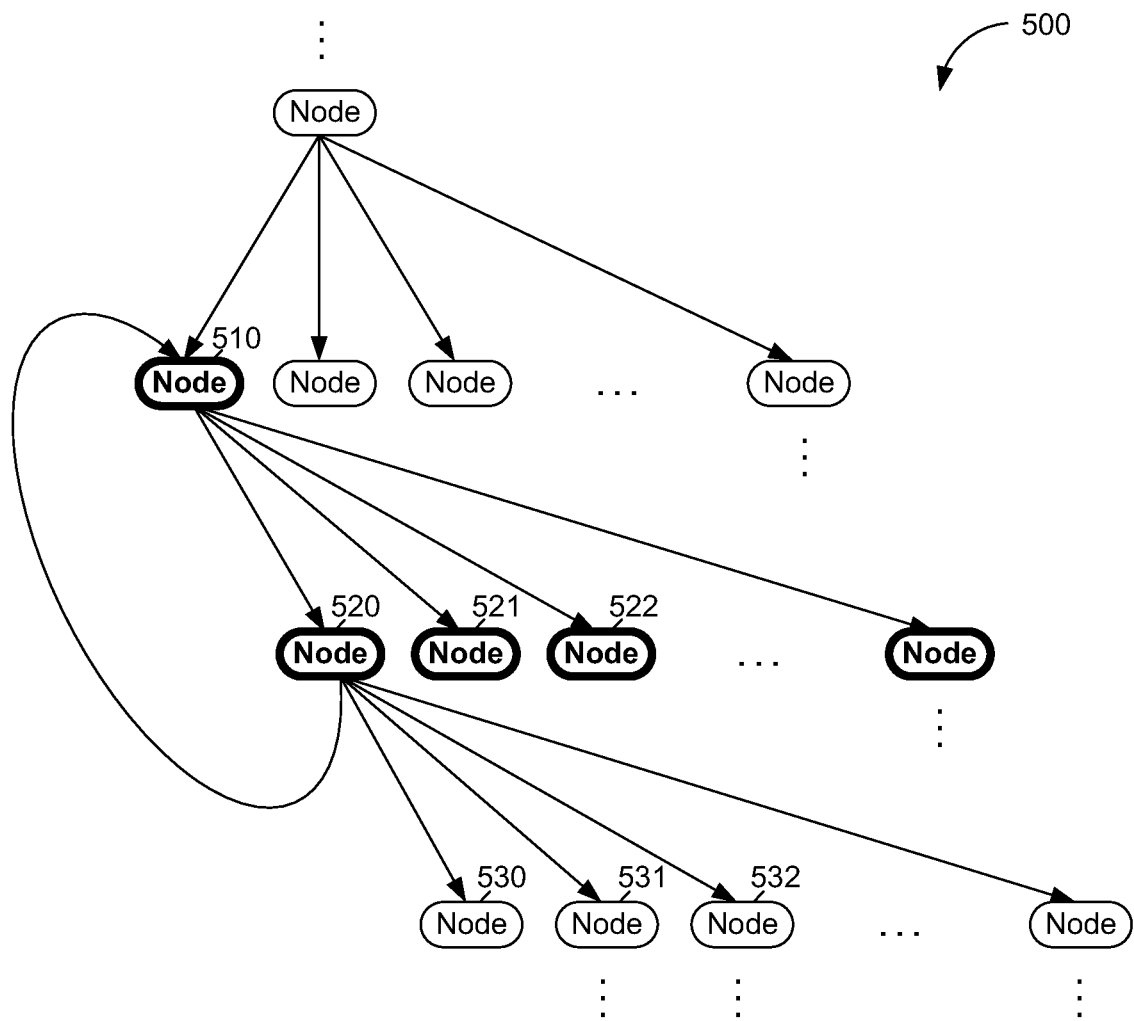
FIG. 5 illustrates an example of an internal structure of a file system during dual phase file system checking.

FIG. 5 illustrates an example of a file system during dual phase file system checking. Dual phase file system checking, like single phase file system checking, also involves locking access to a node by external devices and users, validating both the node's metadata and its referenced data, and unlocking access to the node by external devices and users. Where the node refers to other nodes, however, dual phase file system checking limits the validation of the other nodes to validating their respective metadata.

In the example shown, a portion 500 of a file system contains a given node 510 to be validated. Validating the given node 510 involves validating its metadata and its referenced data. Because the given node 510 refers to other nodes (e.g., nodes 520-522), validating the referenced data of the given node 510 requires validating the metadata of the other nodes (e.g., nodes 520-522). Up to this point, this situation is similar to the situations shown in FIGS. 3 and 4.

With dual phase file system checking, however, there is no need validate the referenced data of the other nodes (e.g., nodes 520-522). Further downstream nodes (e.g., nodes 530-532) are not involved in validating the given node 510, and need not be locked from access by external devices and users during validation of the given node 510.

Additionally, deadlock situations are avoided, even where node references form a closed loop (e.g. symmetric or circular references between or among nodes (see FIG. 4)), because completion of validation for a given node does not depend on validating references of downstream nodes that refer back to the given node.

Figure 6:
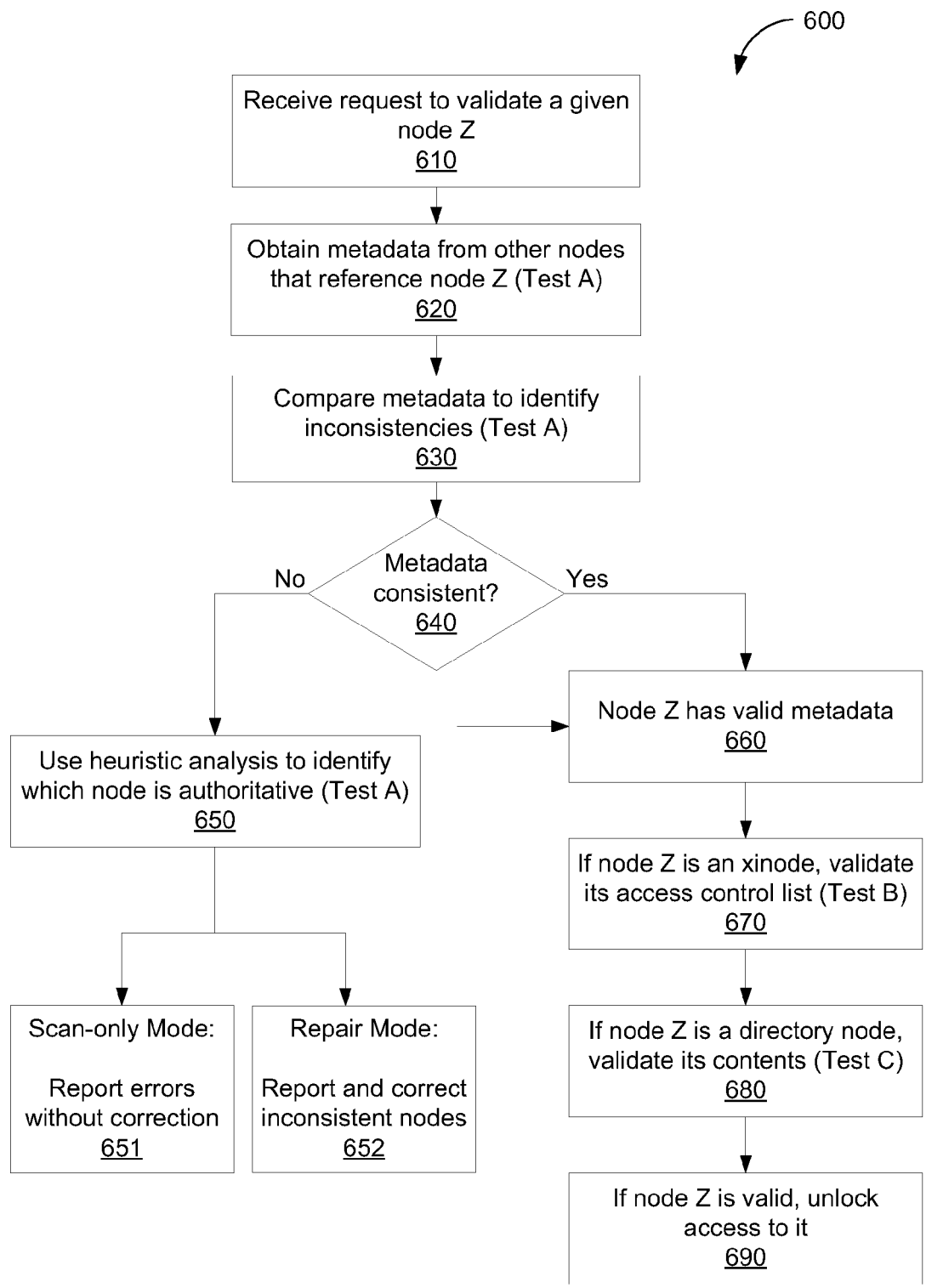
FIG. 6 illustrates an example of an internal structure of a file system, depicted as a sequential arrangement of nodes.

FIG. 6 is a flow chart of a general overview of a method 600, in accordance with an example embodiment, for dual phase file system checking. In dual phase file system checking, two phases of operation are distinguishable.

The first phase involves validating a node's metadata. As used herein, "Test A" refers to the first phase of file system checking. FIG. 6 includes a general overview of Test A, while a more detailed example of Test A is described below (see FIG. 7).

The second phase involves validating a node's referenced data (e.g., an ACL, or contents of a directory). As used herein, "Test B" refers to ACL validation in the second phase of file system checking, and "Test C" refers to directory content validation in the second phase of file system checking. FIG. 6 includes a general overview of Test B and Test C, while more detailed examples of Test B and Test C are described below (see FIGS. 8-9).

In the example shown, operation 610 involves receiving a request to validate a given node. The given node is designated herein as "node Z." In some embodiments, operation 610 is omitted.

The first phase of file system checking (Test A) begins with operation 620. Operation 620 includes obtaining (e.g., requesting and receiving) from other nodes that reference node Z their respective metadata referencing node Z.

Operation 630 involves comparing all the received metadata to identify any inconsistencies in the metadata. At operation 640, includes acknowledging existence of any inconsistencies. In some embodiments, operation 640 may report the inconsistencies as errors.

If any inconsistencies exist, operation 650 involves applying a heuristic analysis to identify an "authoritative node" whose metadata will be treated as correct. If the method 600 is implemented as an example embodiment directed toward a scan-only mode, operation 651 includes reporting the inconsistencies as errors, but not correcting the inconsistencies. If the method 600 is implemented as an example embodiment directed toward a repair mode, operation 652 involves reporting the inconsistencies as errors and correcting the inconsistencies. In some embodiments, operation 651 is omitted. In certain embodiments, operation 652 is omitted.

If no inconsistencies exist, operation 660 involves identifying node Z as having valid metadata. In some embodiments, operation 660 may follow either operation 640 or operation 652.

The second phase of file system checking begins with operation 670. Operation 670 involves determining if node Z is an "xinode," based on its metadata (e.g., its xinode pointer). As used herein, an "xinode" is a node that references an ACL node. Operation 670 includes, if node Z is an xinode, validating the ACL referenced by node Z. Operation 670 is designated "Test B."

The second phase of file system checking continues with operation 680. Operation 680 involves determining if node Z is a directory node, based on its metadata (e.g., node type). As used herein, a "directory node" is a node that references a file node and/or another directory node. Operation 680 includes, if node Z is a directory node, validating node Z's directory contents (e.g., node Z's references to downstream nodes). If node Z is a valid, operation 690 involves unlocking access to node Z by external devices and users.

Although the individual operations of method 600 are illustrated and described as separate operations, one or more of the individual operations may be performed concurrently, and nothing requires that the operations be performed in the order illustrated.

Throughout this specification, unless specifically stated otherwise, terms such as "processing," "computing," "calculating," "determining," "displaying," or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Figure 7:
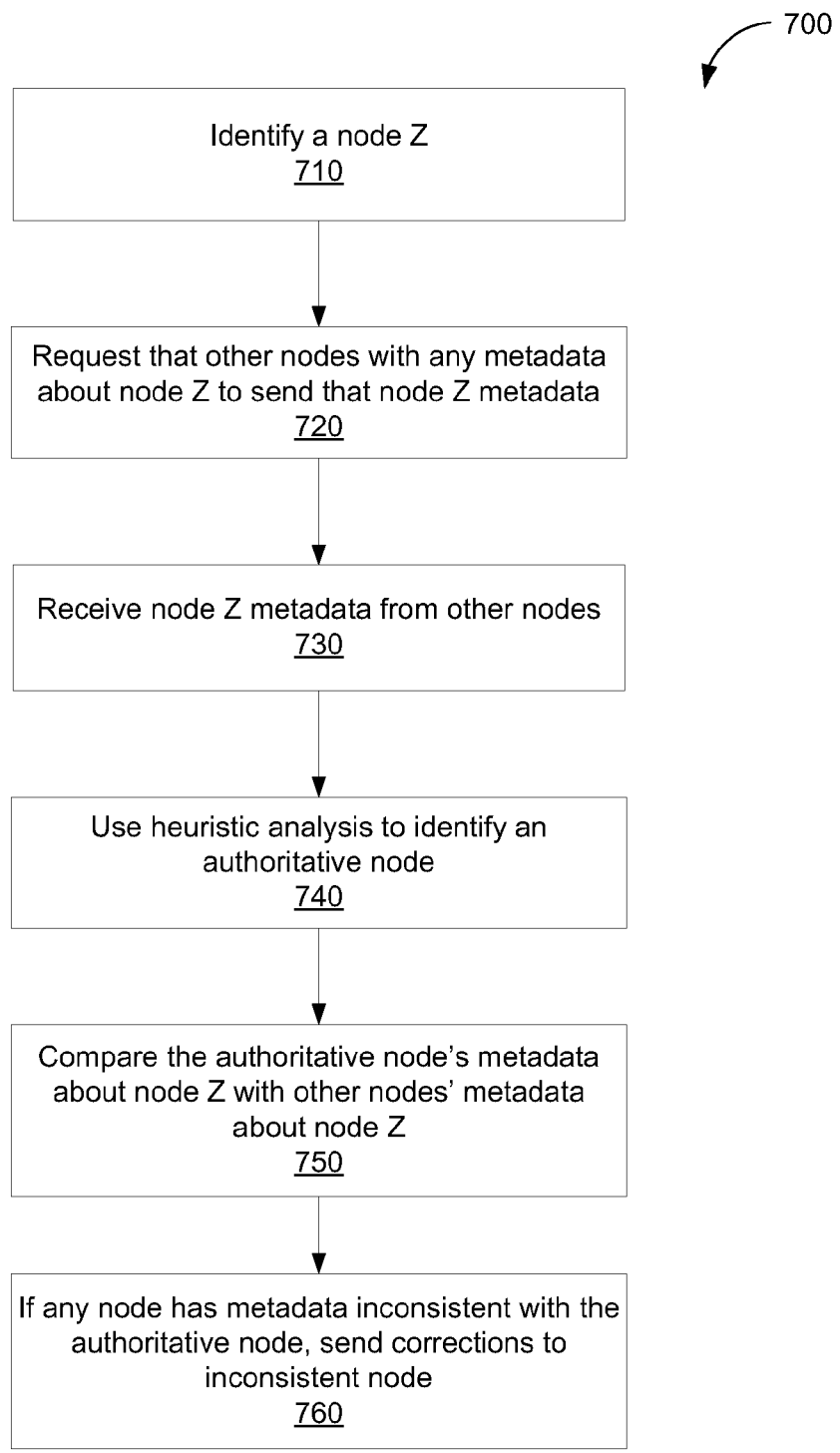
FIG. 7 is a flow chart for a general overview of a method, in accordance with an example embodiment, for dual phase file system checking.

FIG. 7 is a flow chart of a detailed method 700, in accordance with an example embodiment, for a first phase test (Test A) in dual phase file system checking. Test A involves validating a node's metadata, and starting at operation 710, a node Z to be validated is identified. Operation 720 involves requesting that other nodes with any metadata about node Z to send that metadata (e.g., cached metadata that references node Z). Operation 730 includes receiving the requested metadata about node Z from the other nodes (e.g., nodes with cached metadata referencing node Z).

Operation 740 involves using a heuristic analysis to identify an authoritative node. As used herein, an "authoritative node" is a single node whose metadata about the node being tested (e.g., node Z) is treated as most likely to be correct. The authoritative node may be node Z itself, or the authoritative node may be one of the other nodes. A more detailed example of a heuristic analysis is provided below (see FIG. 8). Identification of a single authoritative node allows the metadata of all other nodes to be validated against the authoritative node's metadata.

Operation 750 includes comparing the authoritative node's metadata (about node Z) with the other nodes' metadata (about node Z) to identify which nodes, if any, have metadata inconsistent with the authoritative node's metadata.

Operation 760 involves sending corrected metadata (about node Z) to any nodes with inconsistent metadata (about node Z). In some embodiments, operation 760 is omitted. In certain embodiments, operation 760 is replaced by an operation involving reporting any metadata inconsistencies as errors.

Although the individual operations of method 700 are illustrated and described as separate operations, one or more of the individual operations may be performed concurrently, and nothing requires that the operations be performed in the order illustrated.

Figure 8:
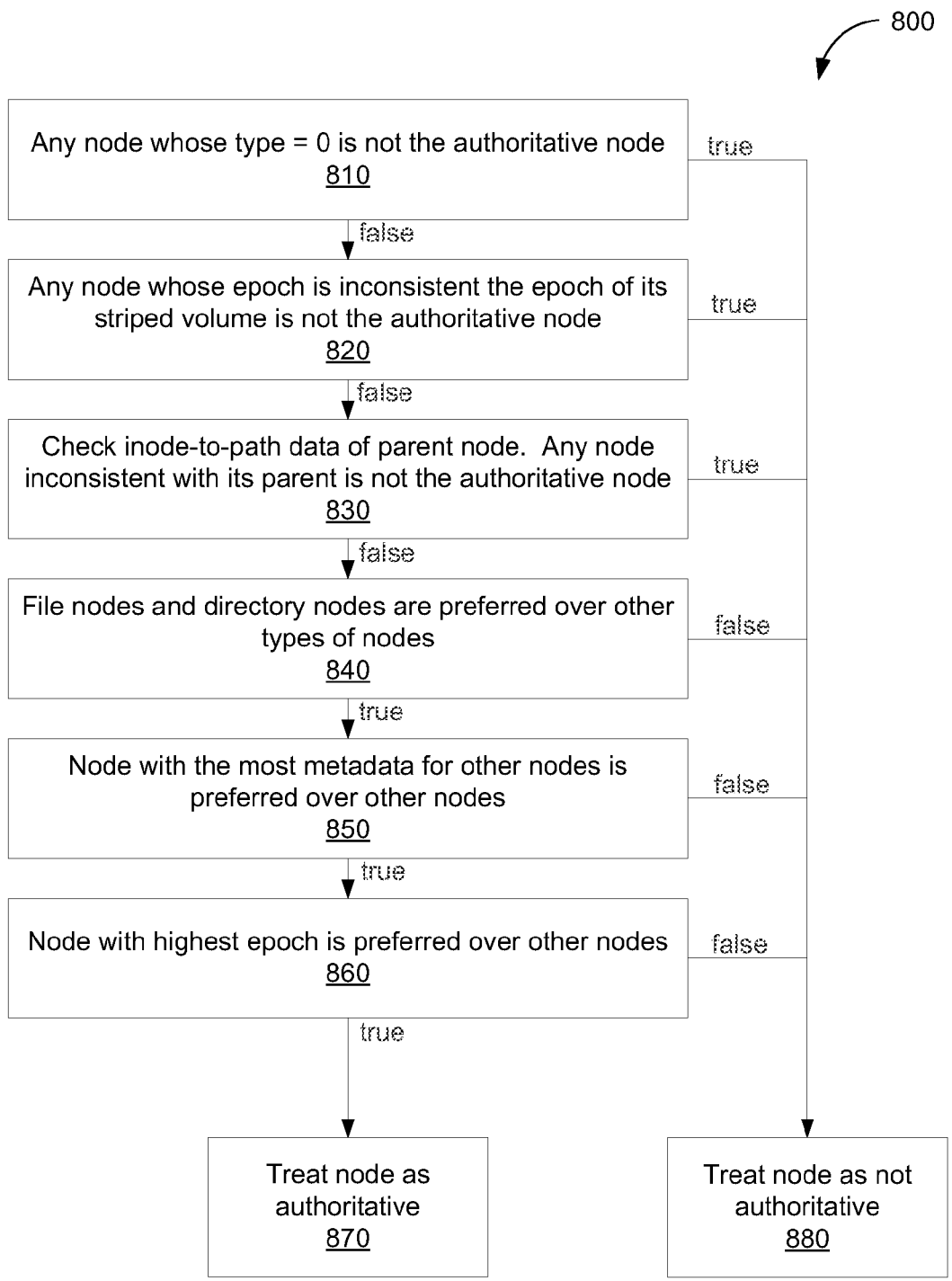
FIG. 8 is a flow chart of a detailed method, in accordance with an example embodiment, for a first phase test (Test A) in dual phase file system checking.

FIG. 8 is a flow chart of a detailed method 800, in accordance with an example embodiment, for heuristic analysis in the first phase (Test A) of dual phase file system checking. Heuristic analysis is used to identify an authoritative node (e.g., a single node whose metadata about node Z is most likely to be correct).

In the example shown, operation 810 includes eliminating any node whose node type equals zero. A node with node type equal to zero is not being currently used by the file system and hence cannot be the authoritative node.

Operation 820 involves eliminating any node whose metadata is inconsistent with metadata associated with its striped volume. In some embodiments, operation 820 eliminates any node whose epoch is different from the epoch of its striped volume.

Operation 830 includes eliminating any node with a parent node having metadata inconsistent with being the parent node. As used herein, a "parent node" is a node of which the instant node is a downstream node (e.g., an "upstream" node). In some embodiments, operation 830 eliminates any node whose parent node has inconsistent "inode-to-path" metadata. "Inode-to-path (I2P)" metadata, according to some embodiments, is metadata indicating a node's logical position among node references in a file system.

If multiple candidates for authoritative node remain, operation 840 involves preferring file nodes and directory nodes over other types of nodes (e.g., eliminating nodes that are not file nodes nor directory nodes). In some embodiments, a different node type preference may apply.

If multiple candidates for authoritative node still remain, operation 850 includes preferring a node with the most metadata references to other nodes (e.g., the greatest number of references to other nodes). In certain embodiments, a different preference based on metadata references may apply.

If multiple candidates for authoritative node still remain, operation 860 involves preferring a node with the highest epoch. In some embodiments, a different epoch preference may apply.

Operation 870 includes identifying an authoritative node. Operation 880 involves identifying eliminated nodes and non-preferred nodes as not the authoritative node. In certain embodiments, operation 880 is omitted.

Although the individual operations of method 800 are illustrated and described as separate operations, one or more of the individual operations may be performed concurrently, and nothing requires that the operations be performed in the order illustrated.

Figure 9:
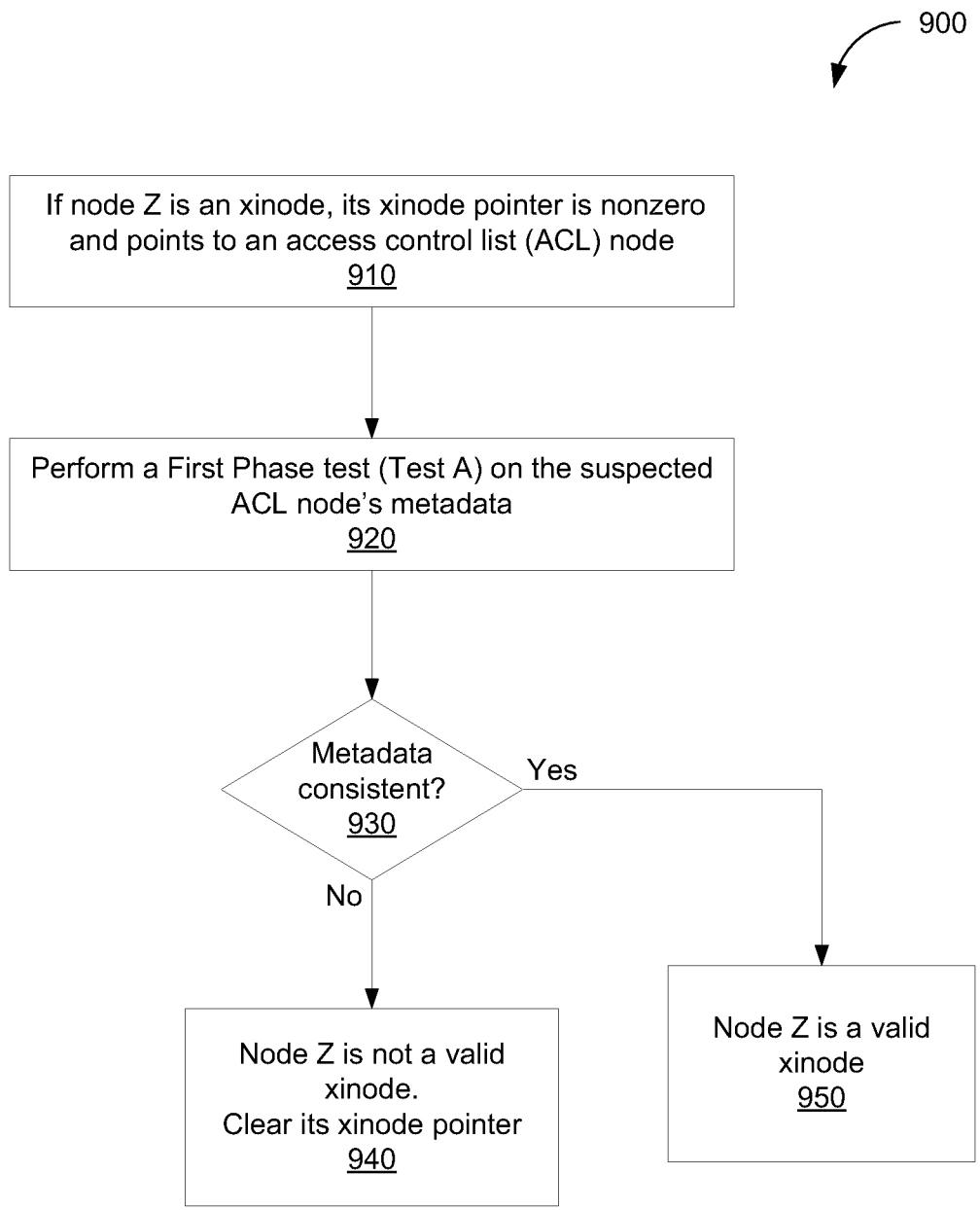
FIG. 9 is a flow chart of a detailed method, in accordance with an example embodiment, for heuristic analysis in the first phase (Test A) of dual phase file system checking.

FIG. 9 is a flow chart of a detailed method 900, in accordance with an example embodiment, for a portion of a second phase test (Test B) in dual phase file system checking. Test B involves validating an ACL referenced by an xinode.

In the example shown, operation 910 includes identifying a given node to be validated (e.g., node Z) as an xinode. As used herein, an "xinode" is a node that references an ACL node. Specifically, an xinode has metadata that includes a non-zero "xinode pointer" (a type of metadata) which refers to an ACL node.

Operation 920 involves performing a first phase test (e.g., Test A) on the ACL node's metadata.

Operation 930 includes determining whether the ACL node's metadata is consistent with being an ACL node. (See FIG. 6, operation 670).

If the ACL node's metadata is inconsistent, operation 940 identifies node Z as an invalid xinode. In some embodiments, operation 940 clears node Z's xinode pointer.

If the ACL node's metadata is consistent, operation 950 identifies node Z as a valid xinode.

Although the individual operations of method 900 are illustrated and described as separate operations, one or more of the individual operations may be performed concurrently, and nothing requires that the operations be performed in the order illustrated.

Figure 10:
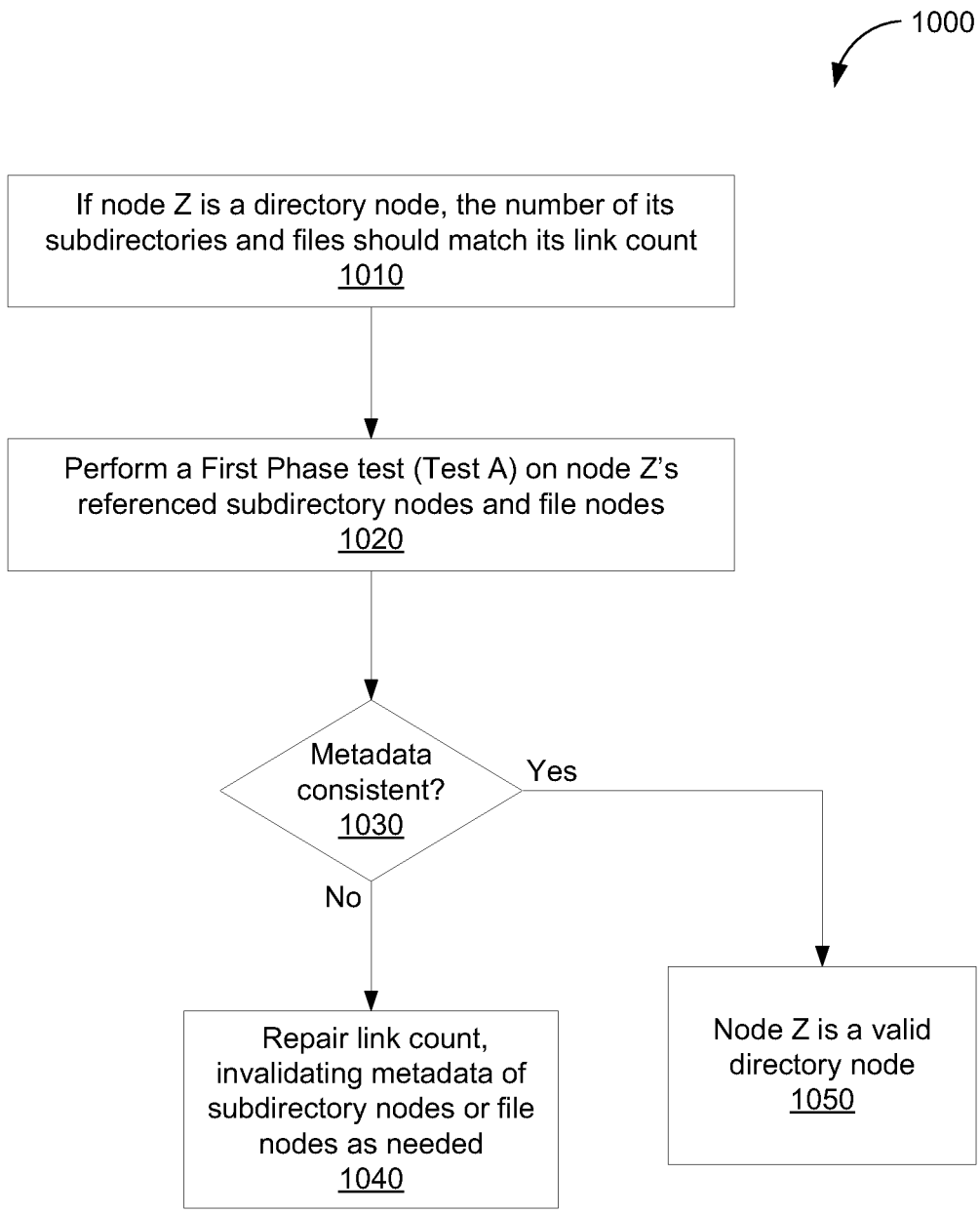
FIG. 10 is a flow chart of an example procedure for a portion of a second phase test (Test B) in dual phase file system checking.

FIG. 10 is a flow chart of a detailed method 1000, in accordance with an example embodiment, for a portion of a second phase test (Test C) in dual phase file system checking. Test C involves validating contents of a directory referenced by a directory node.

In the example shown, operation 1010 includes identifying a given node to be validated (e.g., node Z) as a directory node. A directory node has metadata that references file nodes and/or other directory nodes.

Operation 1020 involves performing a first phase test (Test A) on the metadata of the file nodes and/or directory nodes referenced by node Z.

Operation 1030 includes determining whether node Z's metadata is consistent with the metadata of file nodes and/or directory nodes referenced by node Z. In some embodiments, node Z's link count is compared to the number of nodes referenced by node Z. (See FIG. 6, operation 680).

If node Z's metadata is inconsistent, operation 1040 identifies node Z as an invalid directory node. In certain embodiments, operation 1040 repairs node Z's link count. In some embodiments, operation 1040 invalidates metadata of nodes referenced by node Z where inconsistent with metadata of an authoritative node identified in the first phase test (Test A).

If node Z's metadata is consistent, operation 1050 identifies node Z as a valid directory node.

Although the individual operations of method 1000 are illustrated and described as separate operations, one or more of the individual operations may be performed concurrently, and nothing requires that the operations be performed in the order illustrated.

Figure 11:
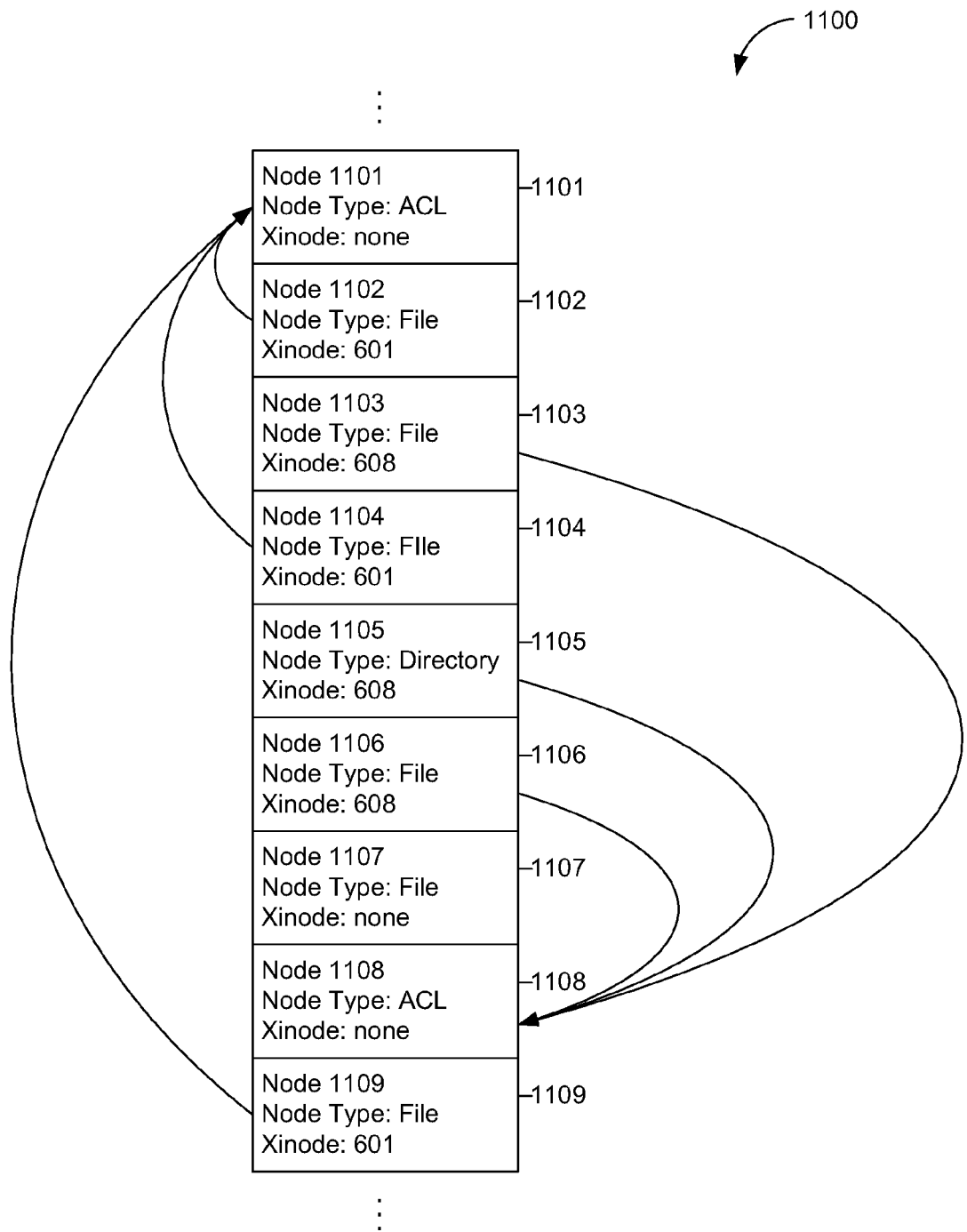
FIG. 11 is a flow chart of an example procedure for a portion of a second phase test (Test C) in dual phase file system checking.

FIG. 11 illustrates an example of an internal structure of a file system, depicted as a sequential arrangement of nodes (e.g., nodes 1101-1109). For additional clarity, single phase file system checking and dual phase file system checking can be described and contrasted as follows.

In the example shown, a portion 1100 of a file system includes several nodes (e.g., nodes 1101-1109). Single phase file system checking may be used to validate, for example, nodes 1101-1103.

Node 1101 is an ACL node and does not refer to any other node. Node 1101 may be validated by validating its metadata (e.g., node type) and its referenced data (e.g., contents of its ACL).

Node 1102 is a file node referencing node 1101. Node 1102 may be validated by validating its metadata (e.g., node type) and its referenced data (e.g., xinode pointer to node 1101). Here, validating the referenced data involves validating metadata of node 1101 (e.g., node type).

Node 1103 is a file node referencing node 1108. Node 1103 may be validated by validating its metadata (e.g., node type) and its referenced data (e.g., xinode pointer to node 1108). Here, validating the referenced data involves validating metadata of node 1108 (e.g., node type).

To increase the speed of single phase file system checking, validation of multiple nodes (e.g. nodes 1101-1103) may occur contemporaneously (e.g., in parallel). As used herein, "contemporaneous" validation refers to simultaneous validation as presented to, or as perceived by, external devices and users.

A deadlock situation arises, for example, where nodes 1101-1103 are validated contemporaneously as a group. Validation of nodes 1101-1102, in the example, occurs as described above. Validation of node 1103, however, requires validation of another group of nodes (e.g., nodes 1107-1109), because node 1108 is referenced by node 1103. If, however, the other group of nodes (e.g., nodes 1107-1109) contains a node (e.g., node 1109) that references a node (e.g., node 1101) in the group being tested (e.g., nodes 1101-1103), validation of both groups of nodes (e.g., nodes 1101-1103 and nodes 1107-1109) is deadlocked, and validation of neither group can be completed.

With dual phase file system checking, the deadlock situation is avoided. For example, where nodes 1101-1103 are validated contemporaneously as a group, the file system checker first validates their respective metadata using Test A. In the example, node 1101 is confirmed to be an ACL node (e.g., of node type ACL), and nodes 1102-1103 are confirmed to be file nodes (e.g., of node type file).

According to the example, a file system checker next validates the nodes' respective referenced data, using Test B or Test C, as appropriate. In the example of ACL node 1101, the file system checker validates the contents of its ACL. In the example of file node 1102, the file system checker performs Test B to determine whether referenced node 1101 is actually an ACL node. In the example of file node 1103, the file system checker performs only Test A on nodes 1107-1109 as a group to validate their respective metadata (e.g., node types). This is sufficient to determine whether node 1103 validly references node 1108. In the example, this completes validation of nodes 1101-1103.

Furthermore, following the example, if nodes 1107-1109 are validated later (e.g., contemporaneously as a group), validation of node 1109 requires validation of metadata for node 1101. In the example, validation of metadata for node 1101 has already been performed. Accordingly, both groups of nodes (e.g., nodes 1101-1103 and nodes 1107-1109) may be validated without encountering a deadlock situation.

Figure 12:
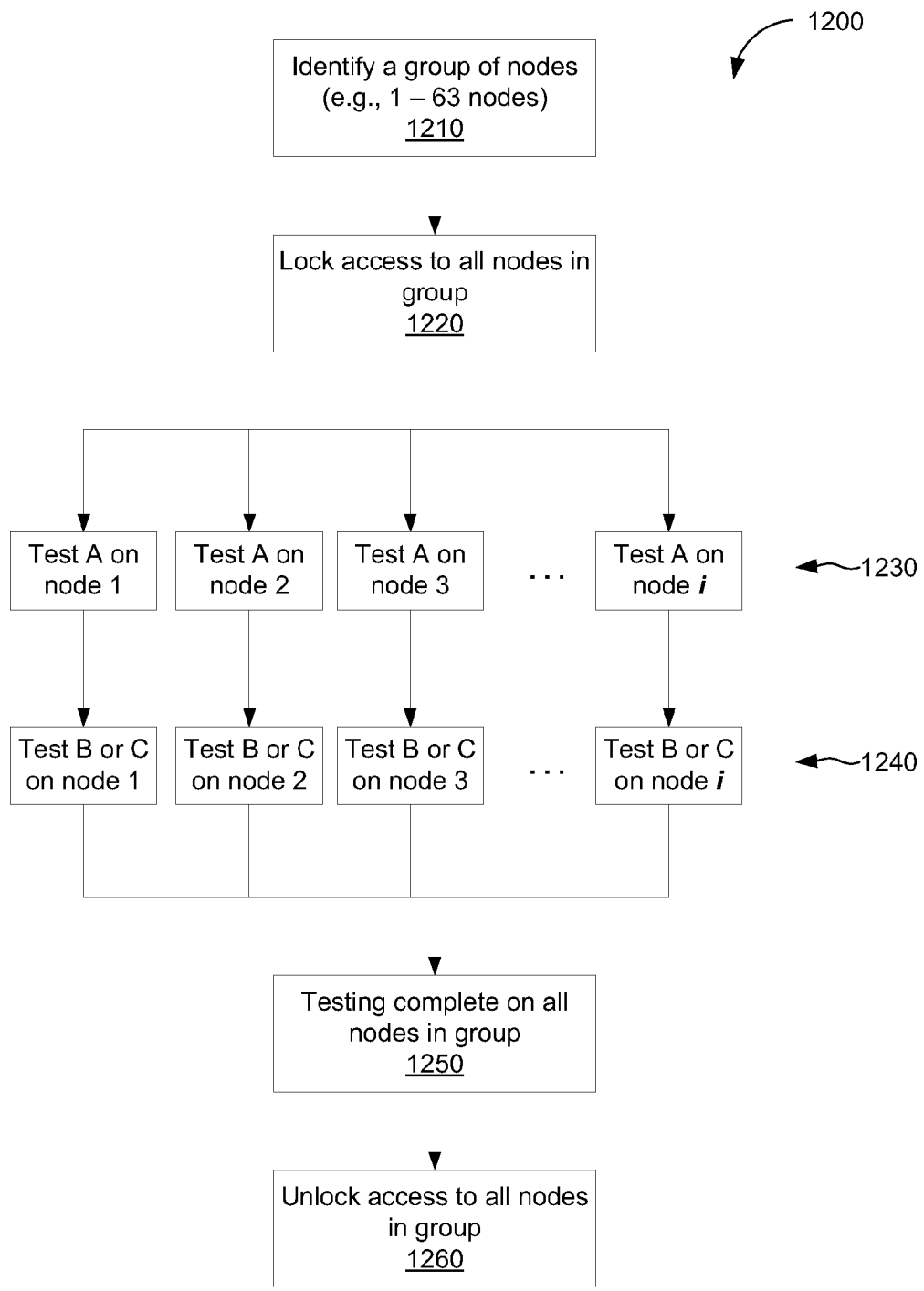
FIG. 12 is a flow chart of an example procedure for parallel testing of multiple nodes in dual phase file system checking.

FIG. 12 is a flow chart of a detailed method 1200, in accordance with an example embodiment, for parallel testing of multiple nodes in dual phase file system checking.

In the example shown, operation 1210 involves identifying a group of nodes to be tested. In some example embodiments, the group may contain up to 63 nodes. In certain example embodiments, the group may contain up to 1000 nodes.

Operation 1220 includes locking access to all nodes in the group by external devices and users.

Operation 1230 involves performing first phase tests (e.g., Test A) on all nodes in the group in parallel (e.g., contemporaneously). In some embodiments, the first phase tests are initiated contemporaneously for all nodes in the group. In certain embodiments, operation 1230 includes waiting for completion of the first phase tests for all nodes in the group.

Operation 1240 involves performing, as appropriate based on node type, second phase tests (e.g., Test B or Test C) on all nodes in the group in parallel (e.g., contemporaneously). In some embodiments, the second phase tests are initiated contemporaneously for all nodes in the group. In certain embodiments, operation 1240 includes waiting for completion of the second phase tests for all nodes in the group.

Operation 1250 represents completion of the first phase tests and the second phase tests. In some embodiments, operation 1250 involves reporting the completion of testing. Finally, operation 1260 involves unlocking access to all nodes in the group by external devices and users (e.g., by marking the nodes in the group as accessible by external devices and users).

Although the individual operations of method 1200 are illustrated and described as separate operations, one or more of the individual operations may be performed concurrently, and nothing requires that the operations be performed in the order illustrated.

Figure 13:
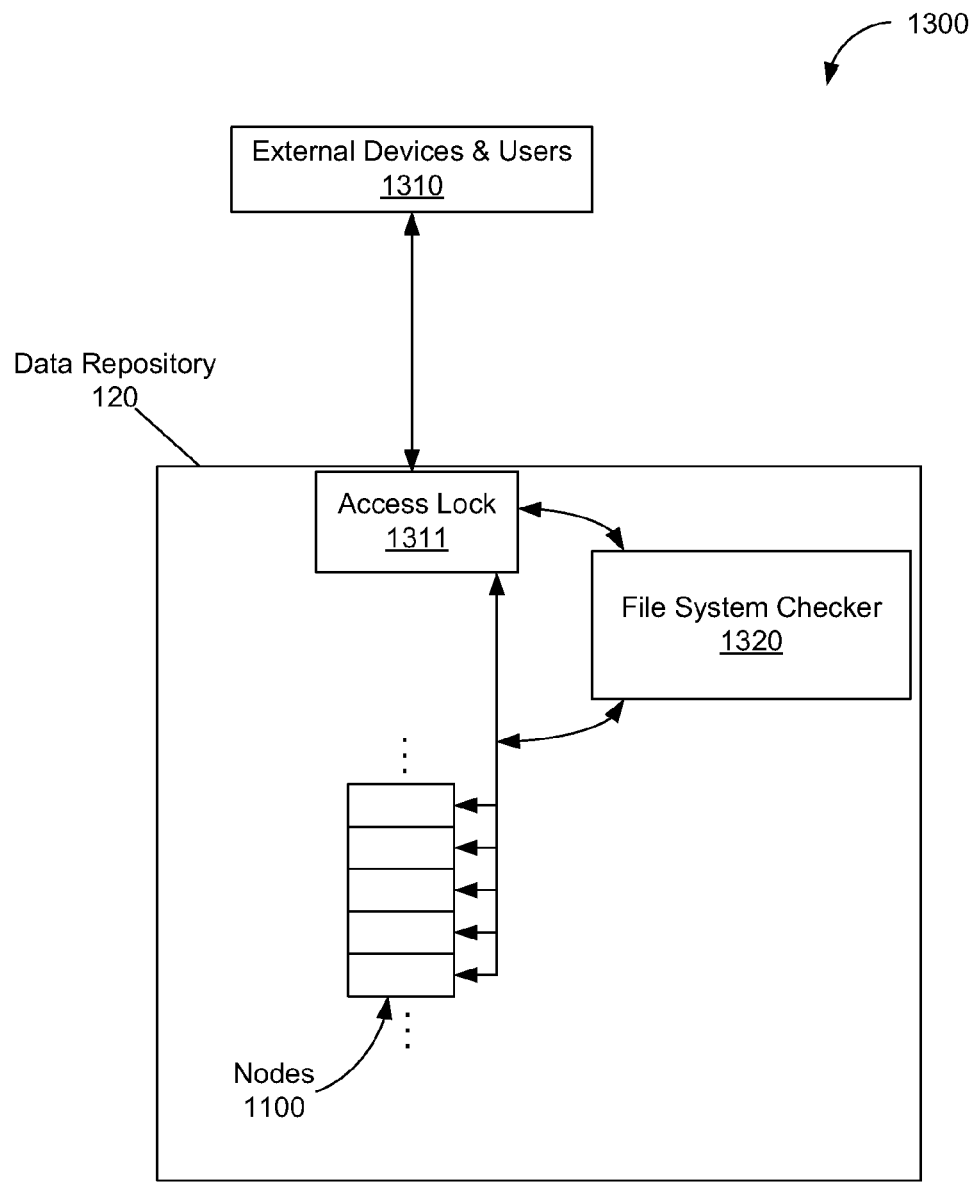
FIG. 13 is a block diagram of an example system for implementing a file system checker in a data repository.

FIG. 13 is a block diagram of an example system for implementing a file system checker 1320 in a data repository 120.

As shown in the example, a data repository 120 is in communication with external devices and users 1310 within a data processing environment 1300. A portion 1100 of a file system is contained within the data repository 120. The portion 1100 of the file system includes nodes (see FIG. 11) in communication with the file system checker 1320. An access lock 1311 enables or disables communication between the nodes (e.g., portion 1100 of the file system), and communicates with the file system checker 1320.

Figure 14:
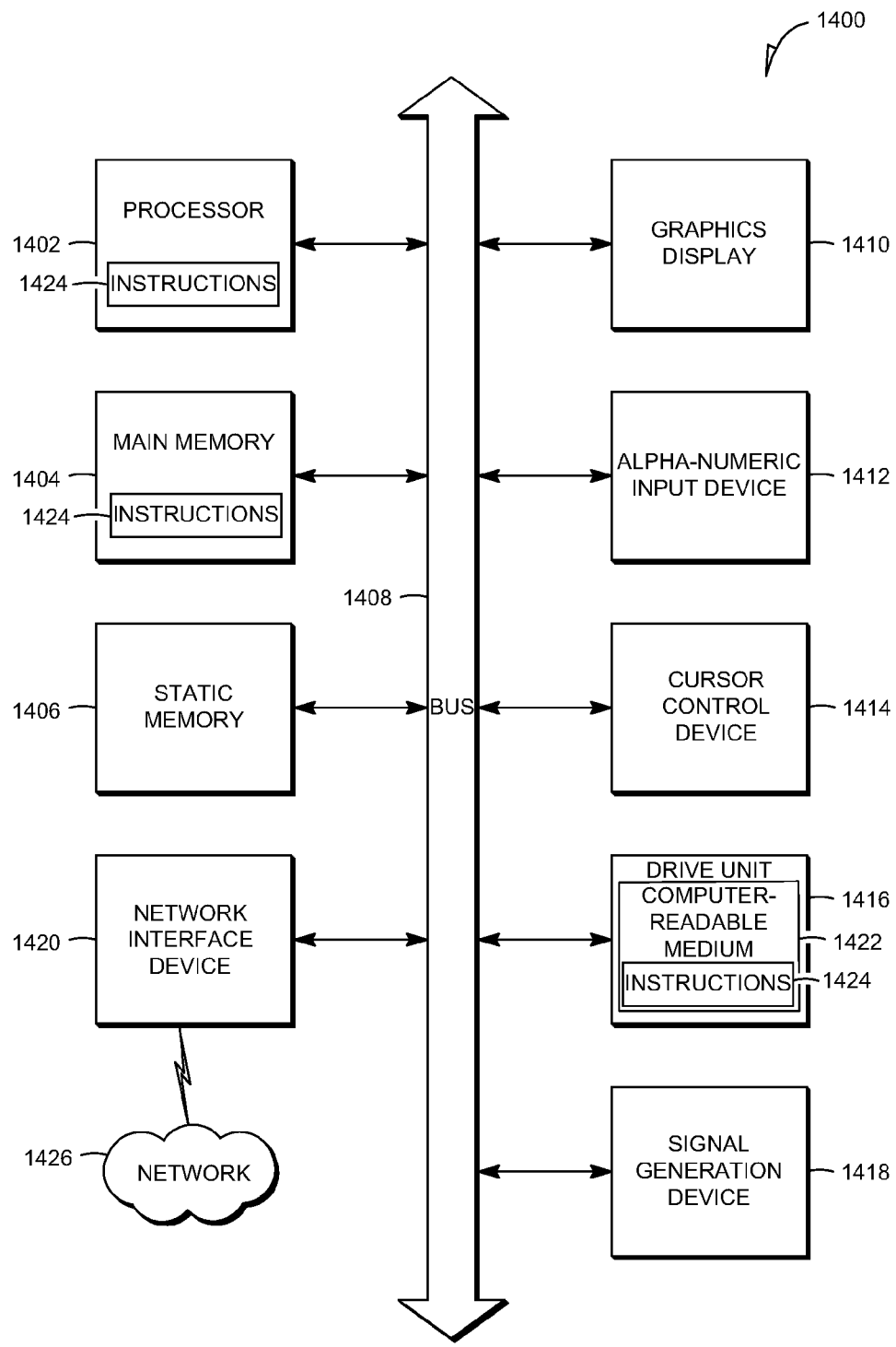
FIG. 14 is a block diagram illustrating components of an example processing system able to perform operations according to instructions.

FIG. 14 shows a diagrammatic representation of processing system in the example form of a machine 1400 (e.g., a computer system, or a computing device) within which a set of instructions 1424 for causing the machine to perform any one or more of the methodologies discussed herein may be executed. In alternative embodiments, the machine operates as a standalone device or may be connected (e.g., networked) to other machines.

In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a smartphone, a web appliance, a network router, switch or bridge, or any machine capable of executing a set of instructions 1424 (sequential or otherwise) that specify actions to be taken by that machine. Further, while only a single machine is illustrated, the term "machine" shall also be taken to include any collection of machines that individually or jointly execute a set (or multiple sets) of instructions 1224 to perform any one or more of the methodologies discussed herein.

The example machine 1400 includes a processor 1402 (e.g., a central processing unit (CPU), a graphics processing unit (GPU), a digital signal processor (DSP), application specific integrated circuits (ASICs), radio-frequency integrated circuits (RFICs), or any combination of these), a main memory 1404, and a static memory 1406, which communicate with each other via a bus 1408.

The machine 1400 may further include a graphics display unit 1410 (e.g., a plasma display panel (PDP), a liquid crystal display (LCD), a projector, or a cathode ray tube (CRT)). The machine 1400 may also include an alphanumeric input device 1412 (e.g., a keyboard), a cursor control device 1414 (e.g., a mouse, a trackball, a joystick, a motion sensor, or other pointing instrument), a drive unit 1416, a signal generation device 1418 (e.g., a speaker), and a network interface device 1420.

The drive unit 1416 includes a machine-readable medium 1422 on which is stored one or more sets of instructions 1424 (e.g., software or firmware) embodying any one or more of the methodologies or functions described herein. The set of instructions 1424 may also reside, completely or at least partially, within the main memory 1404 and/or within the processor 1402 during execution thereof by the computer system 1400, the main memory 1404 and the processor 1402 also constituting machine-readable media.

The set of instructions 1424 may be transmitted or received over a network 1426 via the network interface device 1420. For the purposes of this specification, a "module" includes an identifiable portion of code or data or computational object to achieve a particular function, operation, processing, or procedure While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the example configurations may be implemented as a combined structure or component. Similarly, structures and functionality presented a single component may be implemented as separate components. These and other variations, modifications, additions, and improvements fall within the scope of the invention(s).

What is claimed is:

1. A method of validating a file system having a plurality of nodes, the method comprising:
   identifying from the plurality of nodes a first node, the first node being associated with first metadata and first referenced data, the first referenced data referencing a second node, the second node being associated with second metadata and second referenced data;
   validating the first metadata, the first referenced data, and the second metadata, the second referenced data being excluded from the validation; and
   unlocking access to the first node based on the validating of the first metadata, the first referenced data, and the second metadata.

2. The method of claim 1, wherein the file system is a striped file system.

3. The method of claim 1, wherein the first metadata comprises node type data.

4. The method of claim 1, wherein the first metadata comprises epoch data.

5. The method of claim 1 further comprising:
   identifying from the plurality of nodes a third node, the third node being associated with third metadata and third referenced data, the third referenced data referencing the first node,
   wherein the validating of the first metadata comprises comparing the plurality of first metadata to the third metadata to determine authoritative metadata.

6. The method of claim 1 further comprising:
receiving a request to validate the file system.

7. A method of validating a file system having a plurality of nodes, the method comprising:
performing a primary first phase test on a first node identified from the plurality of nodes, the first node being associated with a first metadata, the primary first phase test being to validate the first metadata;
performing a second phase test on the first node, the first node being further associated with first referenced data, the first referenced data referencing a second node, the second phase test being to validate the first referenced data;
performing a secondary first phase test on the second node, the second node being associated with second metadata and second referenced data, the secondary first phase test being to validate the second metadata; and
unlocking access to the first node based on the primary first phase test, the second phase test, and the secondary first phase test.

8. The method of claim 7, wherein the second referenced data is excluded from the secondary first phase test.

9. The method of claim 7, wherein the file system is a striped file system.

10. The method of claim 7, wherein the first metadata comprises node type data.

11. The method of claim 7, wherein the first metadata comprises epoch data.

12. The method of claim 7 further comprising:
identifying from the plurality of nodes a third node, the third node being associated with third metadata and third referenced data, the third referenced data referencing the first node,
wherein the primary first phase test comprises comparing the first metadata to the third metadata to determine authoritative metadata.

13. The method of claim 7 further comprising:
receiving a request to validate the file system.

14. The method of claim 8, wherein the first metadata comprises node type data.

15. A method of validating a file system having a plurality of nodes, the method comprising:
identifying from the plurality of nodes a first node and a second node, the first node being associated with first metadata and first referenced data, the second node being associated with second metadata and second referenced data, the first referenced data referencing a third node, the third node being associated with third metadata;
accessing the first metadata and the third metadata;
validating contemporaneously the first metadata and the second metadata;
validating the first referenced data and the third metadata; and
unlocking access to the first node based on the validating of the first metadata, the first referenced data, and the third metadata.

16. The method of claim 15, wherein the third node is further associated with third referenced data and wherein the third referenced data is excluded from the validating of the first referenced data and the third metadata.

17. The method of claim 15, wherein the file system is a striped file system.

18. The method of claim 15, wherein the first metadata comprises epoch data.

19. The method of claim 15 further comprising:
identifying from the plurality of nodes a fourth node, the fourth node being associated with fourth metadata and fourth referenced data, the fourth metadata referencing the first node,
wherein the validating of the plurality of first metadata comprises comparing the first metadata to the fourth metadata to determine authoritative metadata.

20. The method of claim 15, wherein the unlocking of access to the first node and the unlocking of access to the third node are contemporaneous.

21. A processing system to validate a file system having a plurality of nodes, the processing system comprising:
at least one processor; and
a memory in communication with the at least one processor, the memory being configured to store a file system validation module executable by the one or more processors, the file system validation module having instructions, which when executed by the one or more processors, cause the at least one processor to perform operations comprising:
identifying from the plurality of nodes a first node, the first node being associated with first metadata and a first referenced data, the first referenced data referencing a second node, the second node being associated with second metadata;
validating the first metadata, the first referenced data, and the second metadata; and
unlocking access to the first node based on the validating of the first metadata, the first referenced data, and the second metadata.

22. The processing system of claim 21, wherein the second node is further associated with second referenced data and wherein the second referenced data is excluded from the validating.

23. The processing system of claim 21, wherein the file system is a striped file system.

24. The processing system of claim 21, wherein the first metadata comprises node type data.

25. The processing system of claim 21, wherein the first metadata comprises epoch data.

26. The processing system of claim 21, wherein the operations further comprise:
identifying from the plurality of nodes a third node, the third node being associated with third metadata and third referenced data, the third metadata referencing the first node;
wherein the validating of the first metadata comprises comparing the first metadata to the third metadata to determine authoritative metadata.

* * * * *